April 11, 1967 M. K. AVEDISSIAN 3,313,464

THERMOCOMPRESSION BONDING APPARATUS

Filed Nov. 7, 1963 10 Sheets-Sheet 1

INVENTOR
M. K. AVEDISSIAN
By M. Ofsaffen
ATTORNEY

April 11, 1967 M. K. AVEDISSIAN 3,313,464

THERMOCOMPRESSION BONDING APPARATUS

Filed Nov. 7, 1963 10 Sheets-Sheet 2

April 11, 1967 M. K. AVEDISSIAN 3,313,464

THERMOCOMPRESSION BONDING APPARATUS

Filed Nov. 7, 1963 10 Sheets-Sheet 5

April 11, 1967 M. K. AVEDISSIAN 3,313,464

THERMOCOMPRESSION BONDING APPARATUS

Filed Nov. 7, 1963 10 Sheets-Sheet 6

THERMOCOMPRESSION BONDING APPARATUS

April 11, 1967 M. K. AVEDISSIAN 3,313,464

THERMOCOMPRESSION BONDING APPARATUS

Filed Nov. 7, 1963 10 Sheets-Sheet 10

United States Patent Office 3,313,464
Patented Apr. 11, 1967

3,313,464

THERMOCOMPRESSION BONDING APPARATUS

Michael K. Avedissian, Mohnton, Pa., assignor to Western Electric Company, Incorporated, New York, N.Y., a corporation of New York Filed Nov. 7, 1963, Ser. No. 322,176
7 Claims. (Cl. 228—3)

This invention relates to methods of and apparatus for bonding and, more particularly, to methods of and apparatus for compression bonding a fine wire to an article.

In the manufacture of semiconductor transistors, it is necessary that internal conductive leads in the form of fine wires be bonded to metallic strips located on the active transistor element and to corresponding posts located on a header supporting the element. The bonding technique employed must be such as to assure that mechanically strong and durable bonds affording dependable, high quality electrical connections are formed. Further, in order to be compatible with present day manufacturing needs, the technique must be of the type which readily lends itself to automation.

A bonding technique that has proven to be highly successful in fulfilling these objectives is that commonly referred to as "wire stitching." "Wire stitching," as best exemplified by Clagett Patent 3,087,239, is a method of wire bonding employing a needle-like bonding tool having an internal longitudinal passageway through which wire is fed from a supply spool to and over a bonding tip affixed to the apex of the tool. In forming a bond, the tip of the tool is lowered onto a part to which the wire is to be bonded whereupon pressure is applied to the tip to press the wire against the part and bond it thereto. Advantageously, during the bonding, collateral bonding energy in the form of heat or ultrasonic energy is applied to the parts being bonded.

After forming the bond, it is necessary that the wire be severed and the free end thereof be formed over the bonding tip of the tool preparatory to the next bonding operation. One way this has been accomplished in the prior art is to cut the wire with a cutting instrument having a cutting edge shaped such that it automatically bends the free end of the wire over the bonding tip of the tool. This approach, however, not only results in an additional step during the bonding operation, i.e., cutting, but if not carefully designed, may result in excess unbonded wire being left extending from the bond. Since this excess wire or "tail," if left at the bond, may cause a subsequent short circuiting of the device, it must be removed, thus, requiring still another step.

The present invention, according to one aspect, is designed to provide new and improved bonding methods and apparatus of the "wire stitching type" which will eliminate the need for both the additional cutting and the wire removal step, and is based upon the combined use of a "nonpreferential" bonding tip and a "preferential" bonding tip. A "nonpreferential" bonding tip can be defined as a bonding tip which exerts symmetrical pressure on the wire during the bonding thereof to form a symmetrical bond, that is, a bond having symmetry about the line of motion of the bonding tip and in which the wire has no directional preference to "stripping" from the article to which it has been bonded. A "preferential" bonding tip, on the other hand, can be defined as a bonding tip which exerts asymmetrical bonding pressure on the wire during the bonding thereof, while simultaneously cutting it, thereby forming an asymmetrical bond and severing the wire.

In the bonding of a wire to first and second areas on an article, according to this aspect of the invention, the first bond is formed with the "nonpreferential" bonding tip and the second bond is formed with the "preferential" bonding tip, thereby bonding and severing the wire at the second area in one step without leaving any "tail." Additionally, both bonding tips are mounted adjacent to each other such that after severing of the wire, the newly formed free end thereof lies beneath and in contact with the "nonpreferential" tip, thereby enabling a subsequent first bond to be formed with this tip.

Another approach in wire severing that has been undertaken in "wire stitching," as best exemplified by Frank et al. Patent 3,083,595, is that of preventing wire from being payed off from the wire supply spool, while simultaneously causing relative movement between the spool and the article to which the wire has been bonded. This causes a tensile force to be exerted on the wire to cause a breaking thereof. While this technique eliminates the generally required cutting step, it presents still other complications.

The point at which a wire will break, assuming all other factors to be equal, is determined by its point of weakest cross section. Desirably for optimum utilization of the "severing by breaking" technique the weakest cross section of the wire should obtain at the bond or its immediate vicinity; however, this does not necessarily occur, the strength of the cross section of the wire at the bond depending upon, among other things, the shape of the bonding tip and the amount of bonding pressure. The wire, therefore, may break anywhere between its point of attachment and the point of force application. Thus, for example, if the wire is restrained in the vicinity of the wire supply spool, as in the prior art, it could break somewhere within the tool, resulting in a loss of the free end of wire and thereby precluding subsequent bonding until the wire is rethreaded through the passageway of the tool, usually a very delicate operation requiring much time and careful handling.

Another very important consideration in the use of a "severing by breaking" technique is that of elongation of the wire. Generally, metal wire when subjected to a tensile force elongates prior to its breaking. This elongation, depending upon the properties of the wire, can be either a pure elastic elongation or an elastic elongation combined with a plastic one. The latter type of elongation results in a permanent increase in the length of the wire, a reduction in the cross section thereof, and a permanent unpredictable change in its properties. Since, the properties of a wire and its cross section are, to a certain extent, determinative of the strength of a bond formed with the wire, bonding with a wire which has previously been elongated may influence the strength of bonds. Where the wire is elongated only once prior to its bonding the effects of elongation are very slight and have little, if any, effect on the strength of the bond; where, however, the wire is elongated several times prior to its being bonded, the effects of this repeated elongation can result in deficient bonds. The latter situation occurs where the wire is broken by clamping it in the vicinity of the wire supply spool or the wire entrance end of the bonding tool. In this instance, the length of wire between the point of clamping and the bond is used to form several subsequent bonds. Accordingly, portions of this length of wire are subjected to several elongations before they are bonded, each elongation possibly changing the characteristics of the wire. It is apparent, therefore, that applying the breaking force over a length of wire which will be used to form a plurality of subsequent bonds can result in nonuniform, as well as mechanically and electrically deficient bonds.

The present invention avoids all of the foregoing difficulties associated with the "breaking by severing" technique by providing a novel means for grasping the wire at a point adjacent to the bonding tip of the tool. This assures that the wire will break intermediate the bonding tip and the bonding area, thereby maintaining continuous control of the free end of the broken wire. Additionally, it assures that no portion of the wire will be elongated more than once, thereby greatly minimizing the effects of elongation and resulting in uniform and reliable bonds.

It is an object of this invention to provide new and improved methods of and apparatus for bonding.

It is another object of this invention to provide new and improved methods of and apparatus for compression bonding a fine wire to an article.

It is a further object of this invention to provide new and improved methods of and apparatus for compression bonding conductive leads to semiconductor devices such that the electrical connections thus formed are of high quality and reliability.

It is a still further object of this invention to provide new and improved methods and apparatus of the "wire stitching type" for compression bonding conductive leads to semiconductor devices.

A method illustrating certain features of the invention may include the steps of bonding the free end of a wire to a first area on an article and preferentially bonding a distal portion of the wire to a second area on the article in a manner such that a continuous span of wire lies between the first and second areas and a new free end is formed for the wire.

Apparatus illustrating certain features of the invention may include means for feeding the wire from a supply of the same and for bonding a free end thereof to a first area on an article with a first bonding tip. Means are provided for bonding a distal portion of the wire to a second area on the article with a second bonding tip of the preferential type.

A complete understanding of the invention may be had from the following detailed description of specific embodiments thereof, when read in conjunction with the appended drawings, in which.

Figure 1:
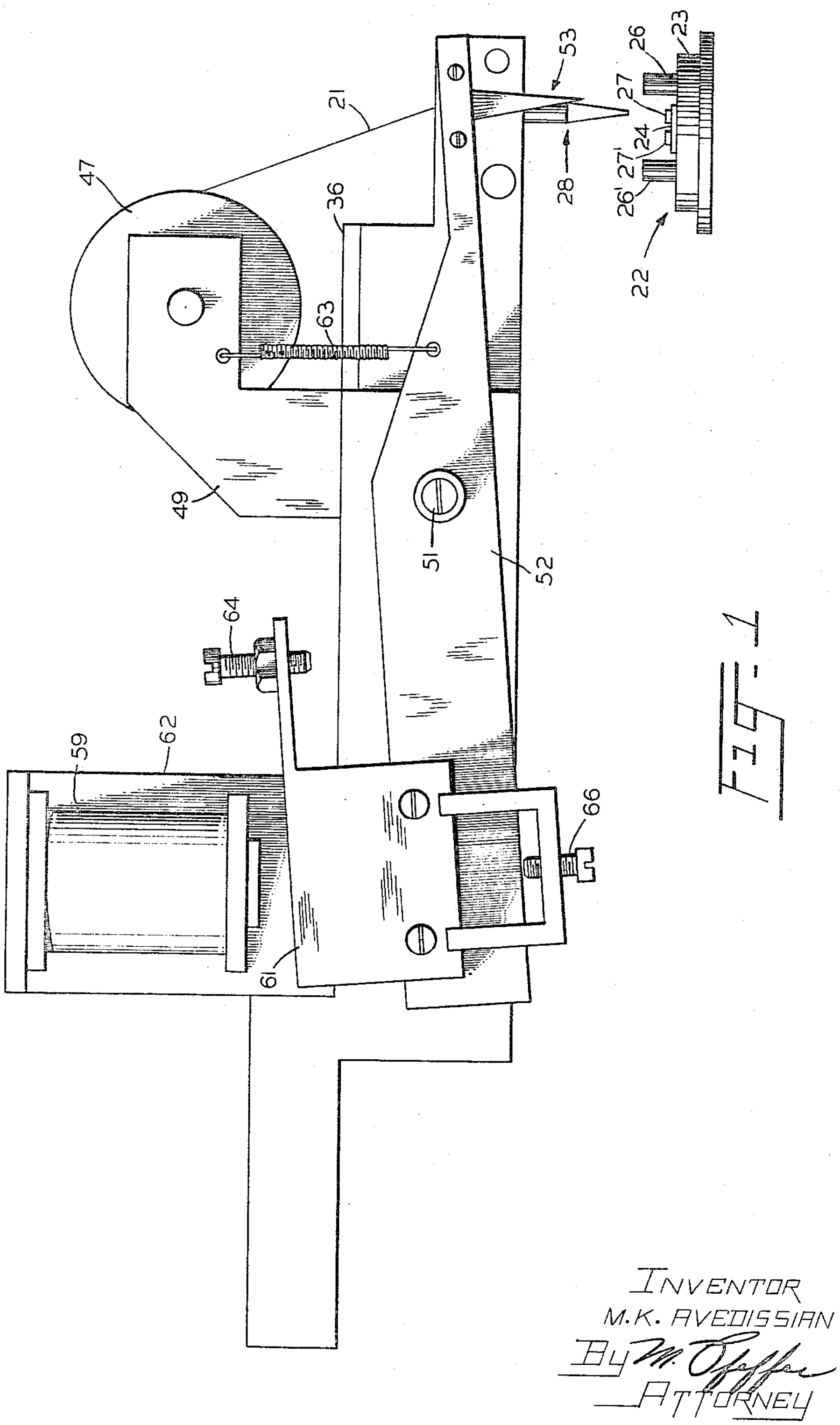
FIG. 1 is a front elevation view of bonding apparatus forming one embodiment of the invention.

Referring now to the drawings and, in particular, to

Figures 2, 3:
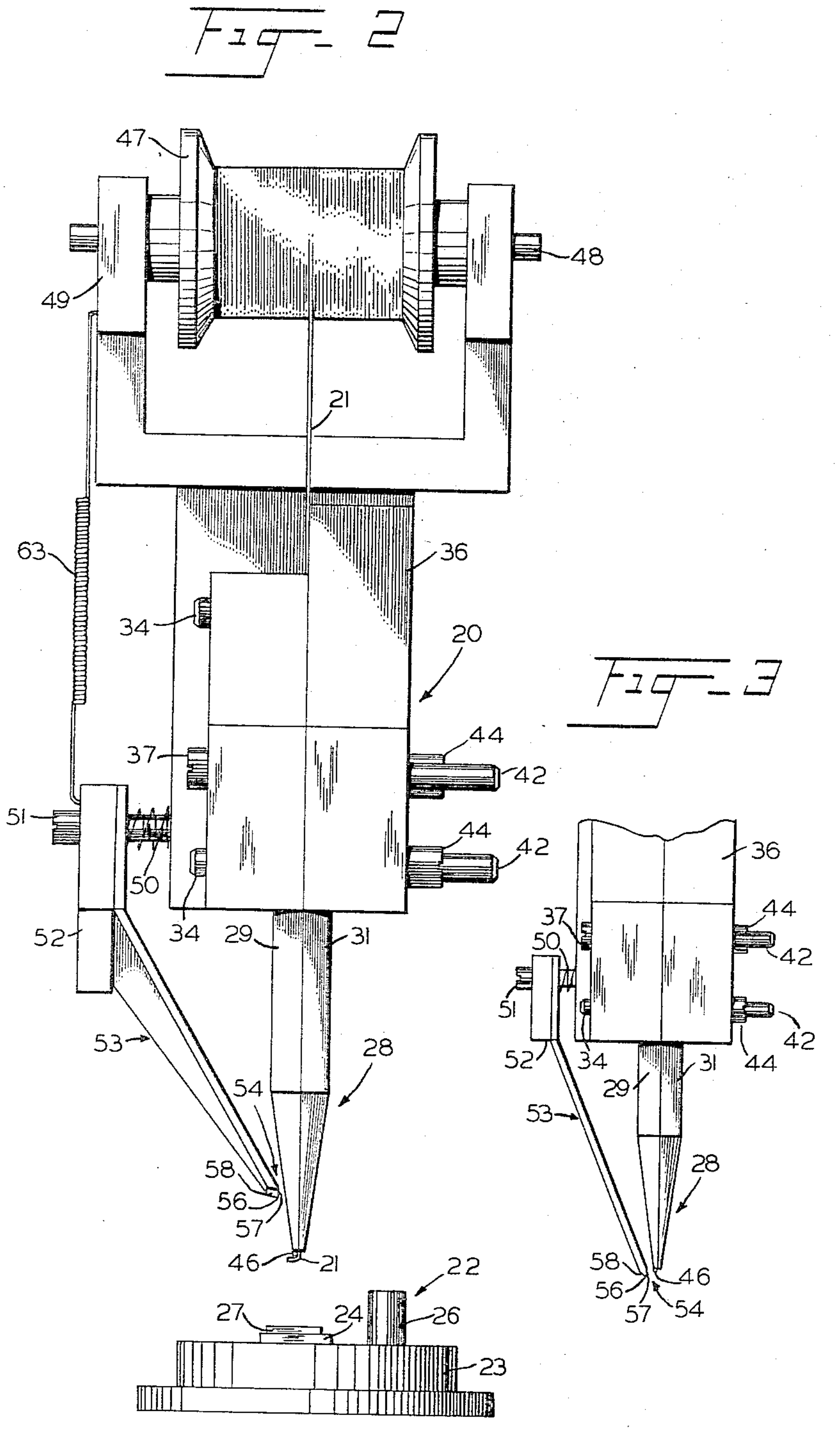
FIGS. 2 and 3 are end elevation views of the apparatus of FIG. 1, with portions removed for the sake of clarity.

FIGS. 1 and 2, there is shown an apparatus 20 embodying certain features of the invention for bonding a fine wire 21 to an article, such as a partially assembled transistor 22.

Typically, the partially assembled transistor 22, hereinafter referred to as the transistor 22 for the sake of convenience, includes a header 23 having a semiconductor body 24 affixed to its top surface and a pair of vertical posts 26–26′. The semiconductor body 24 is in the form of a wafer 30 x 30 mils square and has a pair of metallic stripes 27–27′ attached to its top surface. Representatively, each stripe is a rectangle 2 x 4 mils and is composed of a suitable metal, such as aluminum.

Figure 4:
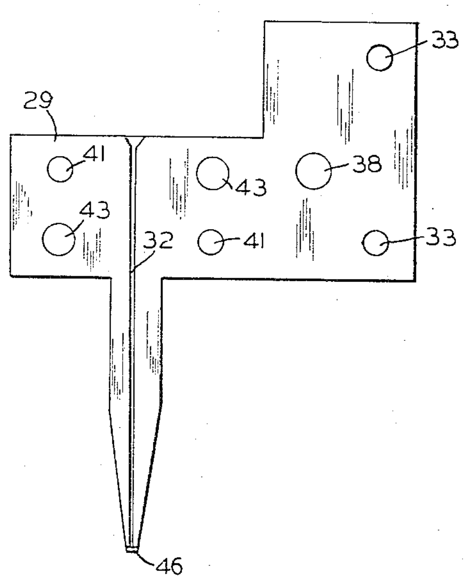
FIGS. 4 and 5 are views illustrating component parts of one embodiment of a bonding needle forming a part of the apparatus.
Figure 5:
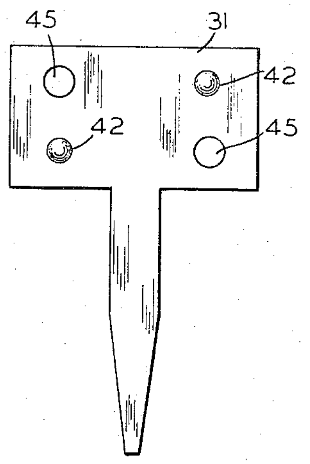

The apparatus 20 includes a tube-like bonding needle, designated generally by the reference numeral 28. The bonding needle 28 in this embodiment is formed from two separable members 29 and 31, each member including an elongated, semi-arcuate body portion tapering to a point-like configuration at one end and diverging to a plate-like configuration at the other end. As seen in FIG. 4, one of the members, in this instance the member 29, is provided with a longitudinal groove 32 in its flat inner surface, the sides of the groove converging near the pointed end of the member 29 so that the distance therebetween is approximately equal to the diameter of the wire 21, which for the dimensions of the transistor set forth above may be 1 mil. The depth of the groove 32, likewise, is approximately equal to the diameter of the wire 21. The plate-like end of the member 29 is provided with a pair of openings 33—33 which enable the member 29 to be positioned on a pair of corresponding dowel pins 34—34 extending from a support arm 36 (FIGS. 1 and 2), the member 29 being firmly secured to the support arm 36, after positioning, by a screw 37 threadable through an opening 38 in the member and a corresponding opening 39 in the support arm. Additionally, the plate-like end of the member 29 is provided with a pair of openings 41—41 for receiving a pair of corresponding dowel pins 42—42 extending from the plate-like end of the member 31 (FIG. 5). This arrangement permits the member 29 to be separated from the member 31 and to be reconnected thereto with accuracy. Threaded openings 43—43 are provided in the member 29 and corresponding openings 45—45 are provided in the member 31 for receiving screws 44—44 to firmly anchor one member to the other after both are accurately positioned with respect to each other by means of the dowel pins 42—42.

Forming the bonding needle 28 from two separable and accurately reunitable members, in the manner described, has proven to be highly advantageous. First, it facilitates the initial threading of the wire 21 through the groove 32 and over a transverse, cylindrical bonding tip 46 affixed to the pointed end of the member 29, and secondly, it enables periodic cleaning of the groove to assure continuous smooth feeding of the wire 21 therethrough.

The wire 21 is fed through the groove 32 to the bonding tip 46 from a supply of the same wound on a spool 47 mounted rotatably on an arbor 48 supported in spaced relationship to the arm by a bracket 49 upstanding therefrom.

Connected pivotally to the side of the support arm 36 by a screw 51 is a lever 52 having an elongated bonding element, designated generally by the numeral 53, depending from one end thereof in juxtaposition with the bonding needle 28. A compression spring 50, disposed concentrically around the shaft of the screw 51, is provided for continuously urging the lever 52 against the head of the screw. This arrangement enables the lateral position of the bonding element 53 to be varied by rotation of the screw 51.

The bonding element 53, whose longitudinal axis is inclined to that of the bonding needle 28, is provided with a bonding tip 54 in the form of a wedge having a thin, sharp cutting edge 56, the side 57 of the tip 54 closest to the bonding needle 28 lying in a plane parallel to the longitudinal axis of the needle, and the other side 58 thereof lying in a plane inclined thereto.

Pivotal motion is imparted to the lever 52 by the coaction of a solenoid coil 59 with an armature 61, the solenoid coil being fixedly connected to the support arm 36 by a bracket 62 and the armature being carried by the lever. Energization of the solenoid coil 59 causes the lever 52 to rotate clockwise about the set screw 51, thereby lowering the bonding element 53 from its retracted position (FIGS. 1 and 2), in which the bonding tip 54 is slightly in front of and above the bonding tip 46 of the bonding needle 28, until the bonding tip 54 extends below that of the bonding needle with its cutting edge 56 substantially parallel to the longitudinal axis of the bonding tip 46 (FIG. 3). Upon de-energization of the solenoid coil 59, the lever 52 returns to its retracted position under the urging of a spring 63 having one end connected to the bracket 49 and the other end connected to the lever. Adjustable stops in the form of set screws 64 and 66 are provided for limiting the upper and lower excursions, respectively, of the bonding element 53.

Figure 6:
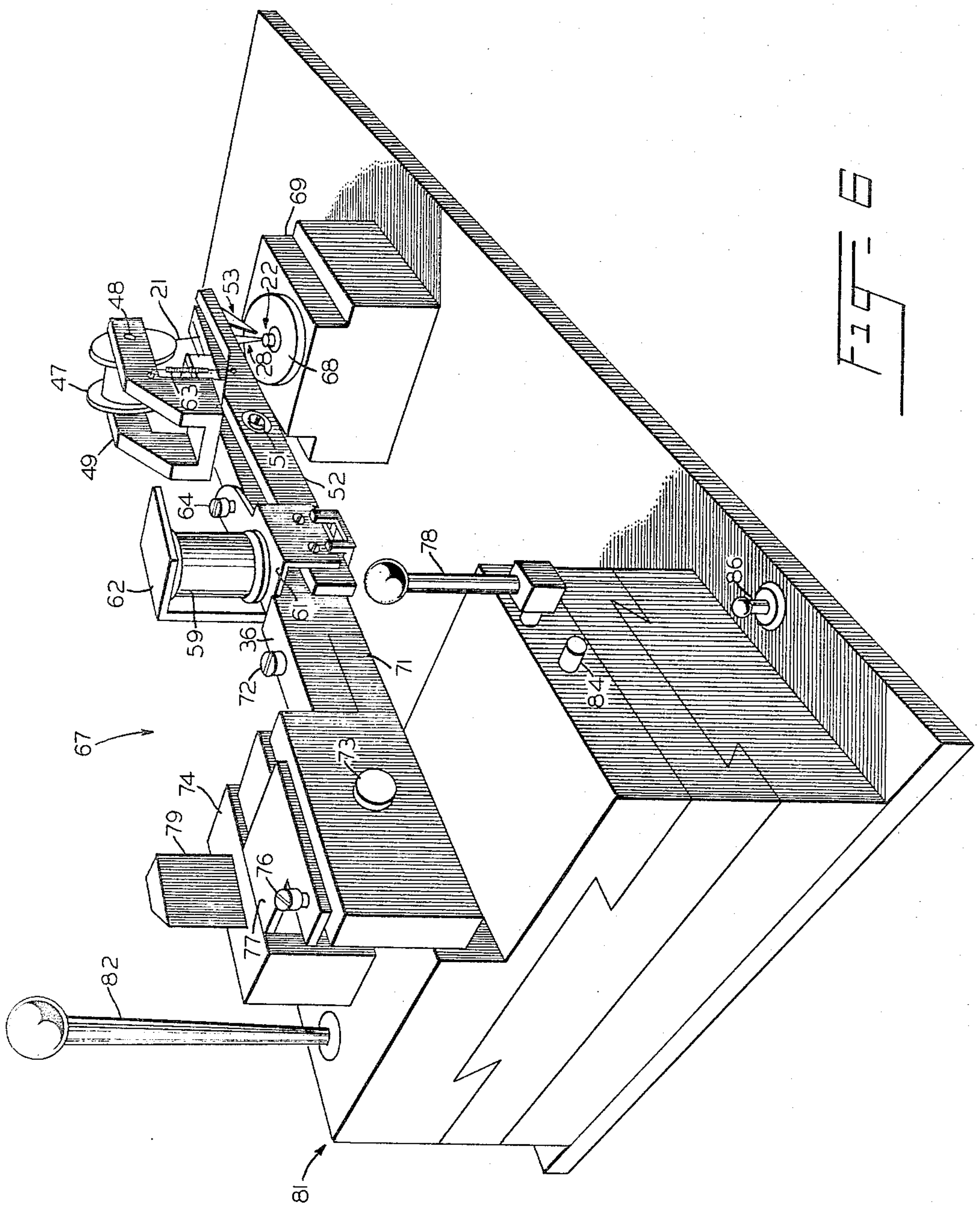
FIG. 6 is a perspective view of a control arrangement for the apparatus.

Bonding with the apparatus 20, according to the invention, can best be accomplished by associating the apparatus with a control arrangement 67 of the type illustrated in FIG. 6. The arrangement 67 which is similar to that disclosed in Clagett Patent 3,087,239 functions to precisely control the movements and operations of the apparatus 20 during the necessary bonding steps, as well as to supply collateral bonding energy, such as heat, to the transistor 22. Since arrangements of this type are well known to those skilled in the art, only a brief description of the one shown in FIG. 6 will be given here.

Referring to FIG. 6 in more detail, the transistor 22 is seated in a nest 68 of a heating unit 69 which functions to supply heat through the header 23 to the areas of the transistor to which the wire 21 is to be bonded, i.e., the stripes 27–27′ and the posts 26–26′. The temperature of the heat supplied should be such that it is below the eutectic temperature of the combination of the materials being bonded together. A temperature of 325° C. has proven to be satisfactory in this regard, where the wire 21 is composed of gold, the stripes 27–27′ of aluminum, and the posts 26–26′ are gold plated.

The support arm 36 is fixedly mounted to a pivot bar 71 by suitable means, such as a screw 72. The pivot bar 71, in turn, is supported for pivotal motion by a pin 73 extending horizontally from a vertical stand 74. The weight of the support arm 36 and the pivot bar 71 is such as to tend to rotate these units counterclockwise about the pin 73. This tendency, however, is resisted by the engagement of a set screw 76, depending from a horizontal extension 77 of the stand 74, with the top surface of the pivot bar 71.

A handle 78 swingably movable in a vertical plane is provided for imparting through suitable means (not shown) corresponding vertical movement to the stand 74 along a vertical shaft 79. The motion of the stand 74, in turn, is transmitted through the pin 73 to the support arm 36 to enable vertical movement of the bonding needle 28 and the bonding element 53 relative to the transistor 22.

Precise horiztontal positioning of the bonding needle 28 and the bonding element 53 with respect to the transistor 22 is accomplished by connecting the shaft 79 to a conventional micromanipulator, designated generally by the reference numeral 81, which may be of the type described in an article by W. L. Bond entitled, "Micromanipulators," and published in the 1956 Bell Laboratories Record, vol. 34, pages 90–92. Operator control of the micromanipulator advantageously is effected by the use of a suitable controller, such as a joystick 82. In order to enable observation of the working area, the arrangement 67 is provided with a suitable optical instrument, such as a microscope (not shown).

Figure 7A:
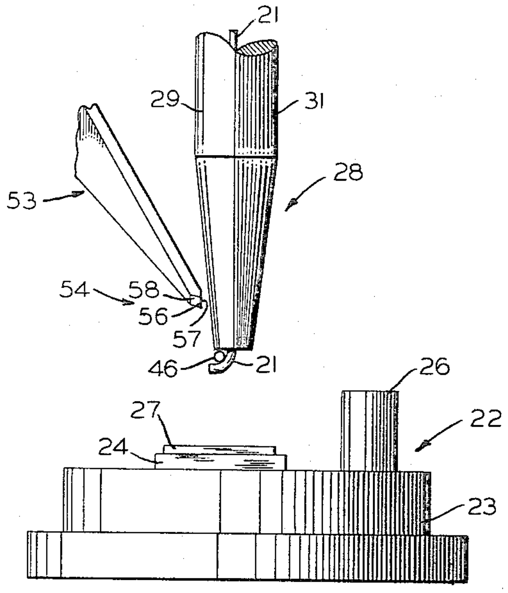
FIGS. 7A–7G are views illustrating a bonding method according to the invention.
Figure 7B:
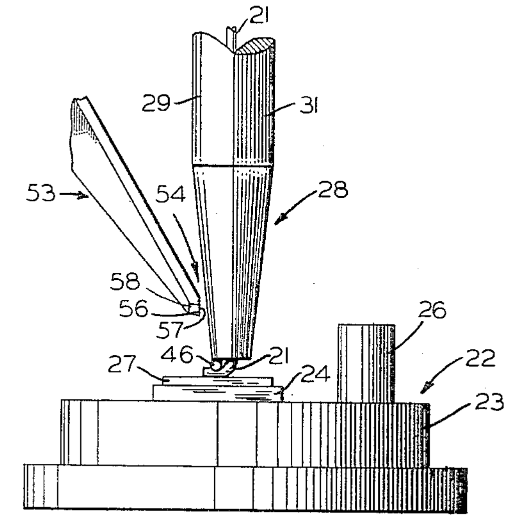

As seen in FIG. 7A, the apparatus 20 is initially positioned so that the bonding needle 28 is above and in registration with the stripe 27, the bonding element 53 being in its retracted position. To bond the wire 21 to the stripe 27, the lower handle 78 is depressed, causing a corresponding lowering of the bonding needle 28. As the bonding needle 28 descends, the bonding tip 46 carries the wire 21 along with it and brings the wire to bear against the top surface of the stripe 27 (FIG. 7B). Continued downward movement of the bonding needle 28 causes a constant pressure to be exerted on the wire 21 to bond it to the stripe 27.

This constant pressure, which representatively is in the order of 20,000 pounds per square inch, is achieved in the following manner: as the bonding tip 46 of the bonding needle 28 urges the wire 21 against the strip 27, an equal upward force is exerted on the support arm 36 through the needle, tending to rotate it and the pivot bar 71 counterclockwise about the pin 73. This tendency, however, is resisted by the weight of the support arm 36 and pivot bar 71 which, it will be recalled from above, tends to rotate these units clockwise about the pin 73. As a result of these two actions a substantially constant pressure is applied to the wire 21 during the bonding thereof to the stripe 27. Moreover, because of the shape of the bonding tip 46, this pressure as well as the resultant deformation of the bonded wire 21 is symmetrical about the line of motion of the bonding tip (FIG. 7C). Accordingly, the strength of the bonded wire 21 at opposing ends of the bond is the same and each of these ends has the same tendency to detach itself from the bonded area when opposing tensile forces are applied thereto. Stated another way, the wire 21 exhibits no directional preference to "stripping" from the stripe 27. Accordingly, bonds of this type, as well as bonding tips similar in function to that of the bonding tip 46 are designated as "nonpreferential." The downward movement of the bonding needle 28 is halted at a preselected position by providing a lower limit stop 84 for the handle 78.

Figure 7D:
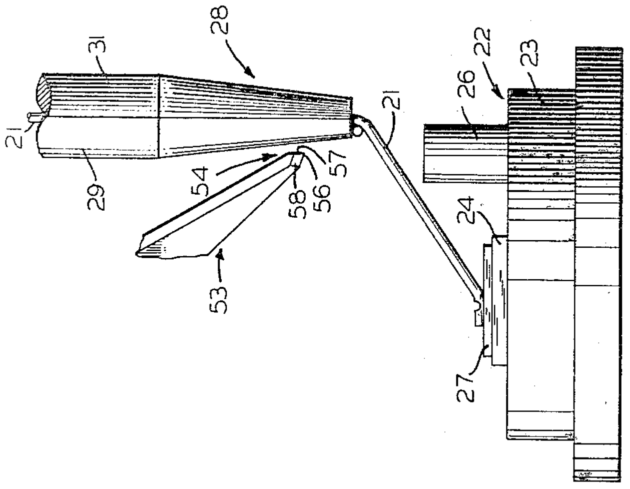
Figure 7E:
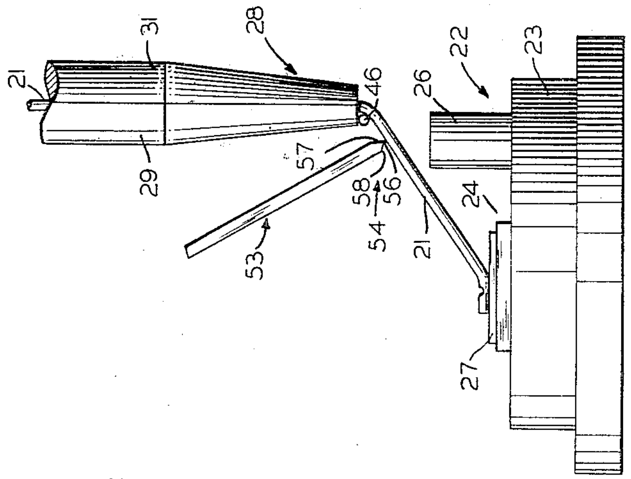
Figure 7C:
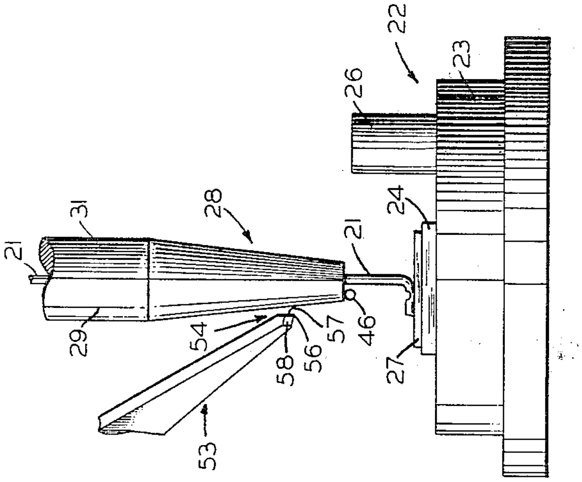
Figure 7F:
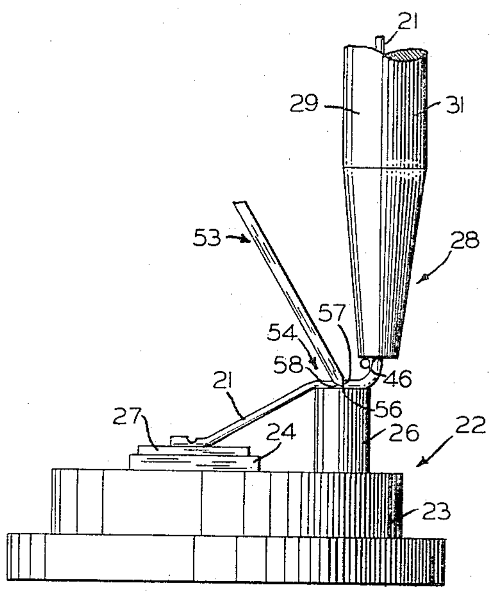

After the wire 21 has been bonded to the stripe 27, in the manner just described, the bonding needle 28 and the bonding element 53 are positioned by means of the handle 78 and joystick 82 so that they are above and in registration with the post 26, a continuous length of wire 21 being payed off from the spool 47 during this movement (FIG. 7D). Next, a switch 86 is actuated to energize the solenoid coil 59, thereby lowering the bonding element 53 to its extended position (FIG. 7E). To bond the wire 21 to the post 26 the handle is depressed as before, this time, however, the bonding is effected by means of the bonding tip 54 of the bonding element 53, resulting in the wire 21 being simultaneously bonded and severed at the post 26 (FIG. 7F). Additionally, it can be seen that the free end of the severed wire 21 has been automatically formed over the bonding tip 46 of the bonding needle 28 to enable subsequent bonding with this tip. The length of wire extending over the bonding tip 46 of the bonding needle 28 is governed by the distance the bonding tip 54 of the bonding element 53 is positioned from the bonding needle. Advantageously, this distance which, of course, depends upon the lateral position of the bonding element 53 is preset to a desired value by adjustment of the screw 51.

Figure 7G:
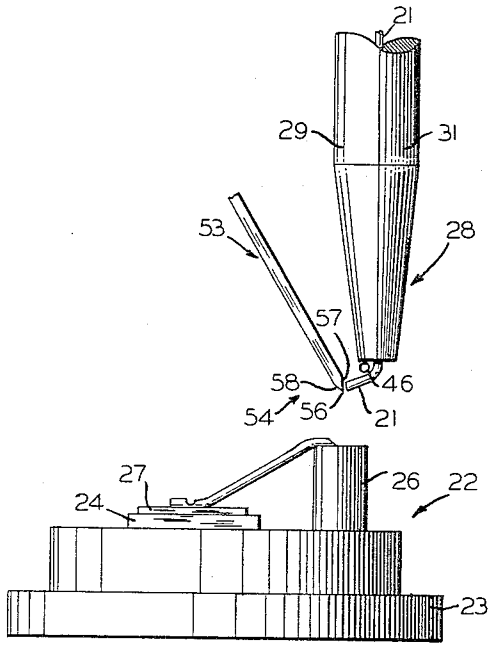

Referring in more detail to FIG. 7F it is seen that only the left inclined side 58 of the bonding tip 54 exerts pressure on the wire 21, the right vertical side 57, since it is parallel to the line of motion of the bonding tip 54, exerting no pressure on the wire 21. As a result of this asymmetrical application of bonding pressure, only that portion of the wire 21 to the left of the bonding tip 54 becomes bonded to the post 26, the right hand portion being unbonded and, additionally, being severed from the left by virtue of the action of the cutting edge 56 (FIG. 7G). Accordingly, bonds of this type, as well as bonding tips similar in function to that of the bonding tip 54 are designated as "preferential."

Bonding of the wire 21 to the other stripe 27' and other post 26' is accomplished in the manner just described for the stripe 27 and post 26.

Bonds formed by application of heat during the compression step, as were those formed in the foregoing description, for obvious reasons are referred to as thermocompression bonds. However, it should be noted that the invention is not so limited, and that other types of collateral bonding energy, such as mechanical vibrations at ultrasonic frequencies, may be employed in lieu of the heat utilized in the instant embodiment. Additionally, if desired, cold welds may be formed in accordance with the principles of the present invention.

In some cases, as previously mentioned, it might be desirable to effect severing of the wire by breaking it. This is accomplished in accordance with certain principles of the present invention by employing a bonding needle 128 of the type shown in FIG. 8 with the apparatus 20 in place of the bonding needle 28. The bonding needle 128 is very similar in appearance and construction to the bonding needle 28 except for one important difference. The members 29 and 31 of the bonding needle 28 are fixed with respect to each other, thereby fixing the dimensions of the passageway for the wire 21. The bonding needle 128, on the other hand, is provided with members 129 and 131 which are arranged so as to be laterally movable with respect to each other, thereby enabling selective enlargement and constriction of the wire passageway.

Figures 8, 9, 10:
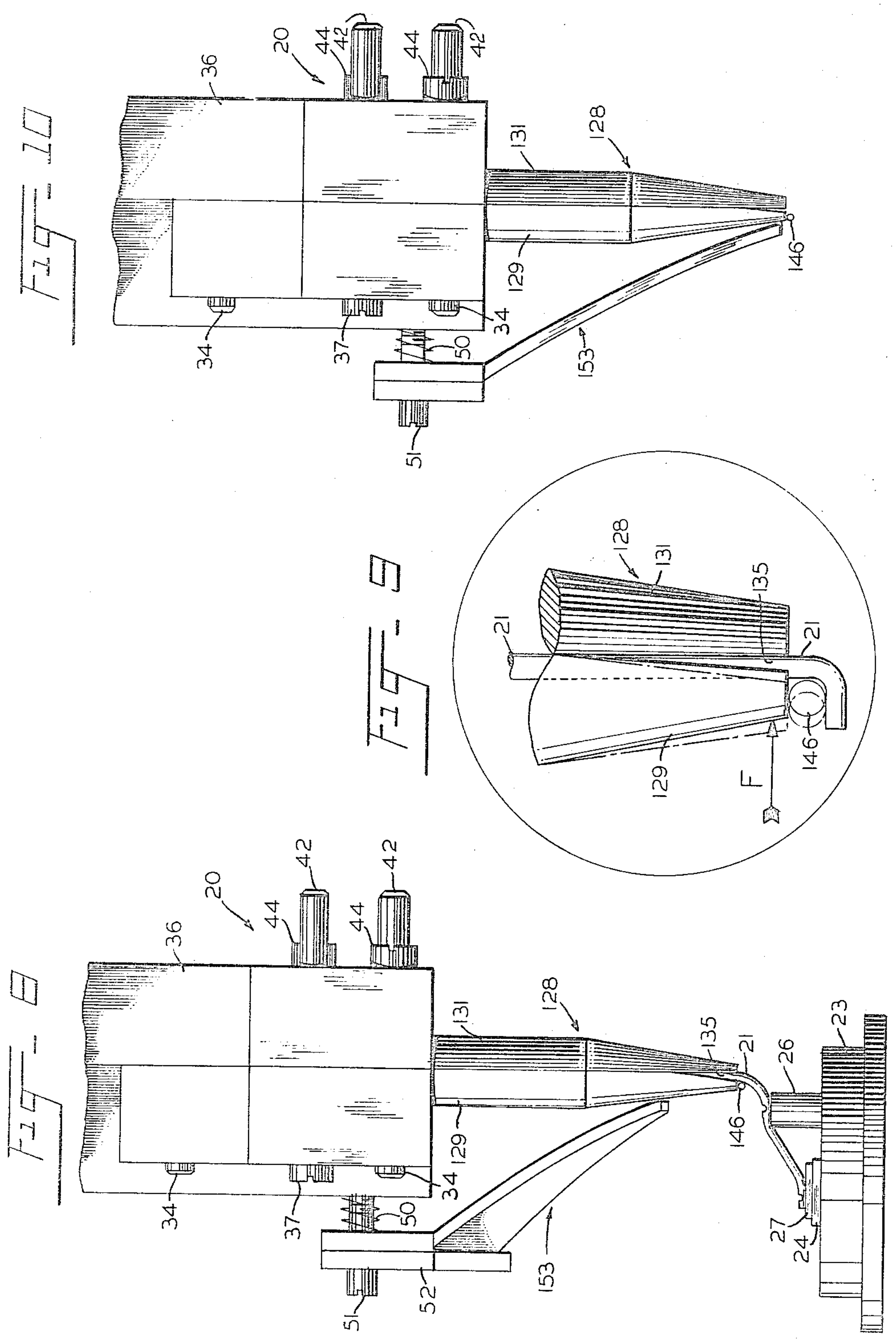
FIG. 8 is an end elevation view of apparatus forming another embodiment of the invention with portions removed for the sake of clarity.
FIG. 9 is an enlarged view of a portion of the apparatus of FIG. 8.
FIG. 10 is a view of the apparatus of FIG. 9 in an operated condition.

Advantageously, this feature of the bonding needle 128 is accomplished by constructing the member 129 so that its flat inner surface is cut away in the vicinity of its pointed end. Accordingly, a gap 135 is formed intermediate the members 129 and 131 when they are connected to each other in the manner previously described for the members 29 and 31. As seen in FIG. 9 when a lateral force F, in the direction of the arrow, is applied to the member 129 it bends toward the other member 131 to narrow the gap 135 and thereby grasp the wire 21. The magnitude of the bending should be such that the wire 21 is firmly grasped but is not damaged or deformed in any way. To this end, by way of example, if the gap 135 is between two and three-tenths of a mil wide, a lateral force F of approximately 7–8 gms. should be applied. For reasons which will become readily apparent from the description which follows, the force F should be applied as close as possible to the pointed end of the member 129.

Advantageously, the force F is applied to the member 129 by an element 153, similar in construction and arrangement to the element 53 except that the element 153 is composed of an elastic material, such as spring steel, and need not have a special configuration tip since bonding according to this aspect of the invention is always accomplished with a bonding tip 146 affixed to the end of the member 129. The lateral spacing between the lever 52 and the support arm 36 is set by adjustment of the screw 51 so that the element 153, in its retracted position (FIG. 10), bears against the member 129 and is deflected. Accordingly, when the element 153 is lowered it slides over the member 129 and exerts a lateral force thereagainst by virtue of spring action. The set screw 66 is adjusted so that the element 153 in its lower position (FIG. 10) bears against the member 129 at a point adjacent to its pointed end.

Figure 11B:
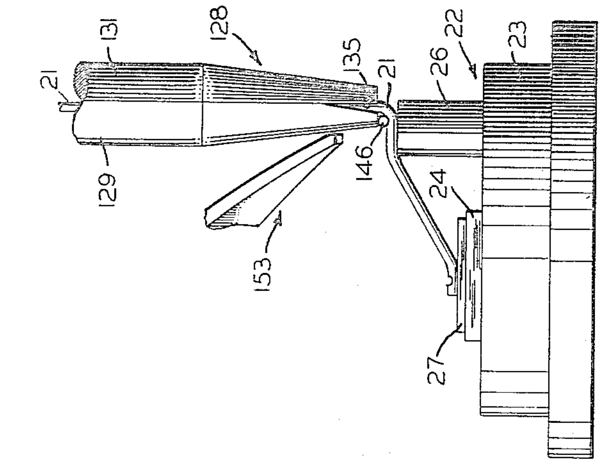
FIGS. 11A–11F are views illustrating an alternative bonding method according to the invention.
Figure 11C:
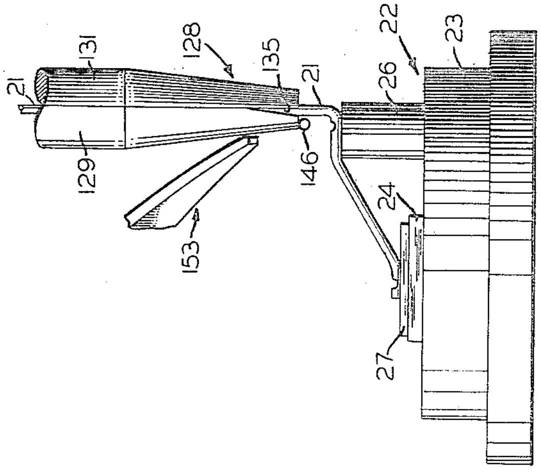
Figure 11A:
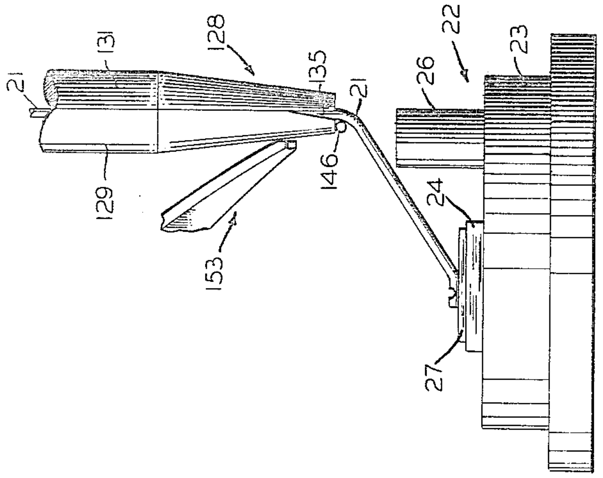
Figure 11E:
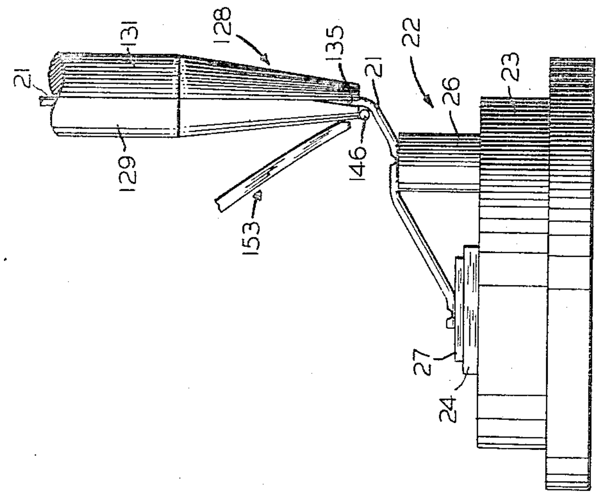
Figure 11F:
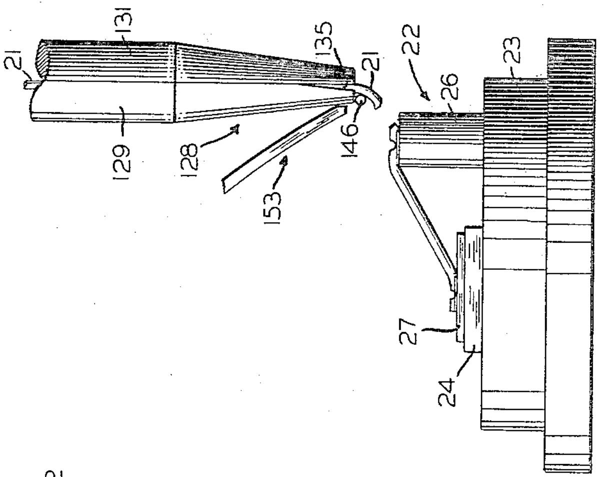
Figure 11D:
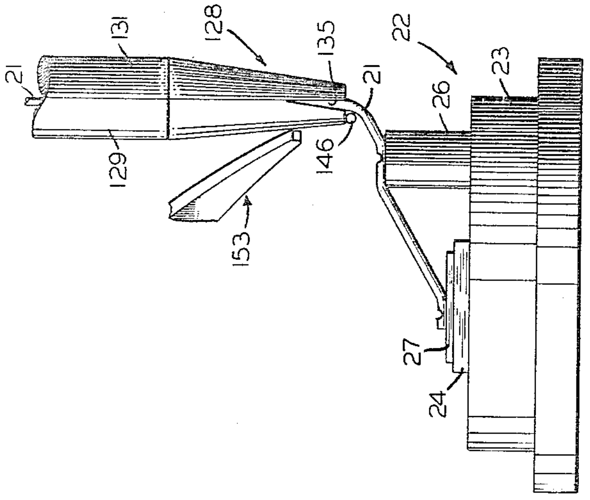

Bonding with the bonding needle 128 will now be described, reference being had to FIGS. 11A–11F. As seen in FIG. 11A, the bonding needle 128 is above the post 26 in readiness for bonding of the wire 21 thereto, the bonding of the wire 21 to the stripe 27 having been effected in the manner previously described for the bonding needle 28. Accordingly, the handle 78 is depressed and the bonding needle 128 lowered to bond the wire 21 to the post 26 (FIG. 11B), the element 153 remaining in its retracted position. After the bond is formed the bonding needle 128 is raised slightly an amount just sufficient to provide clearance between the tip 146 thereof and the bonded wire 21 (FIG. 11C). Next, the bonding needle 128 is moved a predetermined distance to the right (FIG. 11D). The switch 86 is now actuated to lower the element 153 and, thereby apply a lateral force to the member 129 to grasp the wire 21 (FIG. 11E). Severing of the wire is readily effected by moving the needle further to the right (FIG. 11F).

Preferably, the bonding parameters, such as tip shape and pressure, are selected so that breaking of the wire 21 occurs at the bond, whereby the wire formed under the bonding tip 146 by the first movement of the bonding needle 128 to the right is the proper length for forming the next bond. It should be noted that if it is not possible to choose the bonding parameters so that the wire 21 always breaks at the bond, the free end of the wire is never lost since, the wire if it doesn't break at the bond must, of necessity, break somewhere intermediate the pointed end of the bonding needle 128 and the bond. Accordingly, rethreading of the wire 21 through the bonding needle 128 is never necessary. Additionally, as previously pointed out, breaking the wire by grasping it at the wire exit end of the needle, greatly minimizes the effects of elongation.

In some instances, it has been found desirable to combine a cutting method of severing with a breaking method. For example, in the forming of thermocompression bonds, after cutting, the free end of the severed wire sometimes adheres to the surface of the bonded area, necessitating the application of a tensile force to the wire to detach it from the surface.

Figure 12:
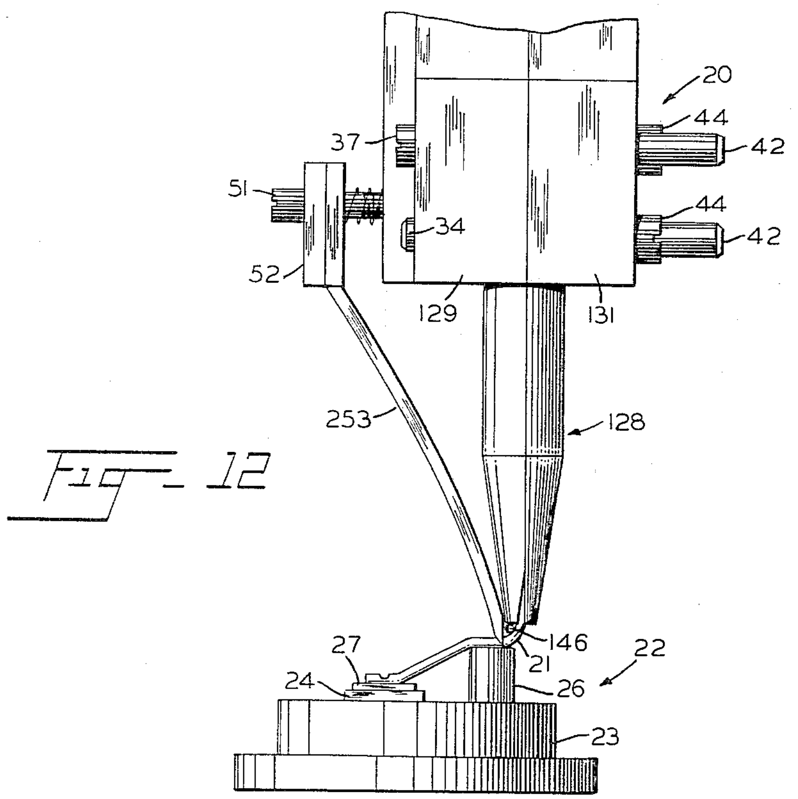
FIG. 12 is an end elevation view of apparatus forming still another embodiment of the invention, with portions removed for the sake of clarity.

This is readily achieved according to the present invention as seen in FIG. 12, by providing the apparatus 20 with the bonding needle 128 and with a bonding element 253 having a bonding tip identical to that of the bonding element 53 and, like the element 153, being composed of an elastic material, such as spring steel. As in the previous embodiment, the spacing between the lever 52 and the support arm 36 is set by adjustment of the screw 51 so that the bonding element 253 continuously bears against the member 129 during its downward movement. The lower stop set screw 66 is adjusted so that the bonding tip 254 of bonding element 253 in the lowermost position thereof protrudes beneath the bonding tip 146 of the needle 128, and engages the member 129 at its pointed end to bend it and grasp the wire 21. Bonding with this arrangement is carried out in the same manner as that described for the embodiment of FIG. 1, the wire, of course, being grasped as the bonding needle 128 moves upwardly after the bonding of the wire to a post. It should be noted that this embodiment will cause complete severing of the wire at the bond regardless of whether or not the full cross section of the wire is cut.

The term "non-preferential" bonding tip as used in the specification and claims, is meant to describe a bonding tip which exerts symmetrical pressure on the wire during the bonding thereof to form a symmetrical bond. Bonding with a "non-preferential" bonding tip and a bond formed by the use thereof, are designated as "non-preferential bonding" and a "non-preferential bond," respectively.

The term "preferential" bonding tip as employed in the specification and claims, is meant to describe a bonding tip which exerts asymmetrical pressure on the wire during the bonding thereof while simultaneously cutting it, thereby forming an asymmetrical bond and severing the wire. Bonding with a "preferential" bonding tip and a bond formed by the use thereof, are designated as "preferential bonding" and a "preferential bond," respectively.

It is to be understood that the above-described embodiments are merely illustrative of the principles of the invention. Other embodiments may be devised by persons skilled in the art which embody these principles and fall within the spirit and scope thereof.

What is claimed is:

1. In an apparatus for bonding a fine wire to first and second areas on an article;

a bisectional tubular needle movably mounted having a first and second section forming a passageway therebetween for receiving said fine wire, said sections being movable with respect to one another upon the application of a transverse force to one of the sections to constrict said passageway;

a cylindrically shaped bonding tip at a free end of one of said sections over which said wire is laid;

a bonding element having a wedge-shaped bonding tip at one end thereof, said wedge-shaped bonding tip having a sharp apical edge formed by the intersection of two opposed sides;

means for pivotally mounting said bonding element on said needle so as to be movable into and out of engagement with said one section to apply a transverse force thereto to constrict said passageway so as to clamp said wire therein, said wedge-shaped bonding tip of said bonding element extending beyond the cylindrical bonding tip of said bonding needle when said bonding element is moved into engagement with said one section;

means for moving said needle to first and second positions, in said first position said bonding needle and bonding element being above said first area, in said second position, said bonding needle and bonding element being above said second area;

means operable at said first position for moving said needle and bonding element toward said first area to bond the wire thereto with said cylindrically shaped bonding tool;

means operable at said second position for moving said bonding element into engagement with said needle to constrict said passageway to claimp said wire; and means for moving said bonding element and needle simultaneously toward said second area to bond the wire thereto with the inclined side of said wedge-shaped bonding tip while simultaneously cutting said wire with said sharp apical edge thereof.

2. In an apparatus for bonding a malleable wire to an article and severing a portion of said wire;

a tubular needle for receiving a section of wire, said needle having a first bonding surface on an end thereof over which a projecting end section of said wire is laid;

a bonding tool pivotally mounted on said needle for engaging said projecting section of said wire;

means for biasing said tool away from said projecting end section of said wire;

said bonding tool having a beveled bonding surface terminating in a cutting edge;

means for pivoting said bonding tool against said biasing means towards said first bonding surface into engagement with said projecting end section of wire; and means for mounting said needle and bonding tool for movement simultaneously toward said article to advance said wire into engagement with said article whereupon said needle continues to move to advance said bonding tool engaging said wire to bond said wire to said article and sever a portion of said wire.

3. In an apparatus for bonding a length of a malleable wire between first and second areas on an article;

a first movably mounted tool positioned over said first of said areas having a passageway therethrough for receiving said malleable wire;

a first bonding tip secured to said first tool adjacent to a termination of said passageway and having a uniformly curved surface over which the end of said wire is laid;

means for advancing the first tool toward a first of said areas to force said tip against said wire to depress said wire into bonding engagement with said first area;

means for moving said first tool over a second of said areas to pay said wire out of said passageway and position a section thereof over said second area;

a second tool pivotally mounted on said first tool;

means on said second tool for simultaneously effectuating a bonding of said wire and a severing of said wire beyond said bond;

means for holding said second tool with the sever effectuating means spaced from said first tool;

means for pivoting said second tool toward said first tool and into engagement with said wire; and means for thereafter moving said first and second tools simultaneously towards said second area to bond and sever said wire engaging said second tool.

4. In an apparatus for bonding a section of a malleable wire between two spaced areas on an article;

a first movably mounted bonding tool positioned over said first of said areas having a passageway therethrough for receiving said malleable wire, said first bonding tool means having a uniformly curved bonding surface at an exit end over which an end of wire is laid;

means for advancing said first bonding tool toward a first of said areas to force said uniformly curved bonding surface against said wire to uniformly depress said wire into bonding engagement with said article;

means for moving said first bonding tool over a second of said areas to pay said wire out of said passageway and position a section thereof over said second area;

a second bonding tool movably mounted on said first tool;

a tip on said second tool movable to engage the wire payed out over said second area, said tip having a sloping bonding surface and a cutting edge at the end of said bonding surface;

means for moving said second tool relative to said first tool toward said wire to advance said tip into engagement with said wire; and means for thereafter advancing said first and second tools simultaneously toward said second area to bond and sever said wire engaging said tip.

5. In an apparatus for bonding a length of fine wire fed from a continuous wire supply between a first and second area of an article, said wire having a free end;

a first bonding tool means having an internal passageway through which said wire is fed and a bonding surface at one end thereof around which said free end of said wire is bent transverse to said internal passageway;

means for moving said first bonding tool means to advance said transversely bent wire into bonding relationship with said first area to bond said wire thereto;

means for laterally moving said first bonding tool means to a position adjacent said second area to pay out said wire and for bending said wire around said bonding surface transverse to said internal passageway;

a second bonding tool means mounted on said first tool having a beveled bonding surface terminating in a cutting edge;

means for moving said second bonding tool means towards said first bonding tool means to move said beveled bonding surface of said second tool means into engagement with said transversely bent section of wire; and means for moving said first tool means and second tool means simultaneously toward said second area to bond and sever said wire and thereby forming a new free end bent around said bonding surface transverse to said internal passageway.

6. In an apparatus as defined in claim 5:

said first movably mounted bonding tool means includes a compressible tube having said bonding surface at said exit end thereof and said internal passageway through which said wire is fed to said bonding surface; and said means for moving said second tool relative to said first tool means also moves said second tool into engagement with said compressible tube to grasp said wire passing through said tube passageway, whereby said wire may be stripped upon movement of said tool away from said article subsequent to bonding.

7. Apparatus according to claim 6 wherein said constricting means constricts the passageway at said wire exit end thereof to assure that if said wire breaks the break will occur intermediate said first tool and said article.

References Cited by the Examiner

UNITED STATES PATENTS

| | | | |
|---|---|---|---|
| 2,697,954 | 12/1954 | Sowter | 29—470.1 |
| 3,101,635 | 8/1963 | Kulicke | 228—13 |
| 3,128,648 | 4/1964 | Clagett | 228—44 |
| 3,149,510 | 9/1964 | Kulicke | 228—44 |
| 3,211,353 | 10/1965 | Belardi et al. | 228—44 |

JOHN F. CAMPBELL, *Primary Examiner.*

M. L. FAIGUS, *Assistant Examiner.*